(12) United States Patent
Dent, III

(10) Patent No.: US 7,331,493 B2
(45) Date of Patent: *Feb. 19, 2008

(54) SIMPLIFIED TWO-MAN LIFTING HARNESS

(75) Inventor: Thomas E. Dent, III, Glenwood Springs, CO (US)

(73) Assignee: TDT Moving Systems, Inc., Vancouver, WA (US)

( * ) Notice: Subject to any disclaimer, the term of this patent is extended or adjusted under 35 U.S.C. 154(b) by 184 days.

This patent is subject to a terminal disclaimer.

(21) Appl. No.: 10/845,940

(22) Filed: May 14, 2004

(65) Prior Publication Data

US 2005/0263551 A1    Dec. 1, 2005

(51) Int. Cl.
*A45F 3/14* (2006.01)
*A44B 11/10* (2006.01)

(52) U.S. Cl. ............... 224/157; 224/184; 224/259; 24/181

(58) Field of Classification Search ........ 224/259, 224/184, 157, 152, 261, 263, 260, 262; 182/3, 182/5; 294/74, 152; 24/171, 172, 196, 194, 24/181
See application file for complete search history.

(56) References Cited

U.S. PATENT DOCUMENTS

| 1,490,066 | A |   | 4/1924  | Carr ............................ 182/3 |
| 1,500,510 | A |   | 7/1924  | McElvar et al. ............ 224/259 |
| 1,535,208 | A | * | 4/1925  | Drennan ...................... 224/158 |
| 1,879,480 | A |   | 9/1932  | Pures ........................... 224/260 |
| 1,995,439 | A | * | 3/1935  | Tompkins .................... 24/194 |
| 2,431,780 | A |   | 12/1947 | Theal |
| 2,477,432 | A | * | 7/1949  | Walsh .......................... 224/260 |
| 2,528,078 | A | * | 10/1950 | Cuthbert Quilter .......... 224/171 |
| 2,651,441 | A |   | 9/1953  | Rau et al. .................... 224/259 |
| 2,743,497 | A | * | 5/1956  | Davis ........................... 24/196 |
| 2,855,133 | A | * | 10/1958 | Mullin ......................... 224/184 |
| 3,120,403 | A |   | 2/1964  | Molzan et al. ............... 294/74 |
| 3,258,788 | A | * | 7/1966  | Henri Anciaux ............. 5/625 |
| D267,598  | S |   | 1/1983  | Lyer et al. ................... D3/32 |
| 4,406,348 | A |   | 9/1983  | Switlik, II .................... 182/3 |

(Continued)

FOREIGN PATENT DOCUMENTS

EP            596839 A2      5/1994

(Continued)

*Primary Examiner*—Nathan J. Newhouse
*Assistant Examiner*—Justin M. Larson
(74) *Attorney, Agent, or Firm*—Rick Martin; Patent Law Offices of Rick Martin, P.C.

(57) ABSTRACT

A shoulder harness is made of straps forming a figure eight having a criss-cross strap configuration, in one embodiment, across a user's back. Two loops are formed which hang under the user's arms. The loops may be threaded into slots on the top of a wide tension buckle, which is centered in front of the user. A webbed lift strap about five-inches wide is threaded into the base of the tension buckle. A second user threads the opposite end of the lift strap into the base of the second user's tension buckle. The lift strap is placed under a load and carried by the two users over rough surfaces that dolly wheels could not handle. Another embodiment includes a central ring to join three or more users' straps together. Another embodiment is a shoulder harness made of vertically hanging straps.

8 Claims, 4 Drawing Sheets

U.S. PATENT DOCUMENTS

| | | | |
|---|---|---|---|
| 4,887,752 A | 12/1989 | Nauta | 224/202 |
| 5,009,349 A | 4/1991 | Eide et al. | |
| 5,269,449 A | 12/1993 | Sattler | 224/258 |
| 5,289,896 A * | 3/1994 | Giglio | 182/3 |
| 5,307,967 A | 5/1994 | Seals | 224/257 |
| 5,466,040 A | 11/1995 | Fainsztein | 297/183.6 |
| 5,503,448 A | 4/1996 | Dewey | |
| 5,588,940 A | 12/1996 | Price et al. | |
| 5,890,227 A * | 4/1999 | Brown | 2/102 |
| 5,927,781 A | 7/1999 | Lyons, Jr. | |
| 6,039,376 A | 3/2000 | Lopreiato | |
| 6,446,849 B1 | 9/2002 | Schleifer | 224/258 |
| 6,508,389 B1 | 1/2003 | Ripoyla et al. | 224/157 |
| 6,641,008 B2 * | 11/2003 | Falzone et al. | 224/157 |
| 6,729,511 B2 | 5/2004 | Dent, III | |
| 6,790,201 B2 * | 9/2004 | Meyer | 604/345 |
| 2002/0148866 A1 | 10/2002 | Dent, III | 224/259 |

FOREIGN PATENT DOCUMENTS

| | | |
|---|---|---|
| FR | 790.246 | 11/1935 |
| FR | 2 809 936 | 12/2001 |
| GB | 2 224 193 A | 2/1990 |
| JP | 3-205204 | 9/1991 |

* cited by examiner

SIMPLIFIED TWO-MAN LIFTING HARNESS

FIELD OF INVENTION

The present invention relates to a streamlined shoulder harness and lifting strap apparatus suited to allow two or more users to lift large, heavy appliances and the like.

BACKGROUND OF THE INVENTION

Inventions which enable two persons to more easily lift and carry heavy objects such as refrigerators, stoves, washer/dryers, large loaded crates and the like, are known in the art. Common construction being such that the weight is suspended from the user's shoulders, leaving their arms and hands free to steady the load. A strap or straps is suspended between each user's shoulder harness, wherein the strap carries the load.

U.S. Pat. No. 2,431,780 (1947) to Theal discloses a two-person lifting apparatus having a shoulder harness for each user. Each shoulder harness pins the user's arms against his ribs while the load is carried by a strap assembly, which is suspended between them. The pinning of the user's arms reduces the efficiency of the user and increases the risk of accidents.

U.S. Pat. No. 5,009,349 (1991) to Eide et al. discloses a shoulder harness for supporting a pair of straps that carry a load. The harness permits free arm movement. The two straps required each have metal hoops at each end. The hoops hook onto hooks, which are suspended from the shoulder harness. The hoops prevent the sliding of the strap under an appliance. The system requires access from each side of the appliance to place the straps under the appliance from the side.

U.S. Pat. No. 6,729,511 (2004) to Dent, III discloses a single, central lifting strap. It is used by professional movers who require the strap size adjustments, the shoulder pad and the flexible modes of operation. A two carabiner attachment assembly supports a wide central tension buckle for each worker. A single wide strap or webbing is suspended between the users to support a load.

The present invention utilizes the same one central strap, which can be easily slid under an appliance from front to back or side to side. A relatively wide tension buckle containing two slots may be suspended from each user via a pair of looped shoulder straps. Each of the user's tension buckles supports the end of a relatively wide, flat, web-type strap. This strap may support any load that two users could lift. In addition, several users may connect their strap to a central ring for lifting heavy loads.

The harness allows full arm movement, and one embodiment provides an "X" pattern across the user's back to evenly distribute the load and help prevent a strap from slipping off a shoulder. Only one metal piece is needed to produce the present invention. This metal piece is the central tension buckle with slots for the shoulder straps. No strap size adjustments or carabiner assemblies are required. In this embodiment, the harness may not be adjusted. However, prior art buckles may be added to the shoulder straps to allow size adjustment. This invention is ideal for occasional use by an amateur user who rented a truck to move his furnishings.

SUMMARY OF THE INVENTION

An aspect of the present invention is to provide a two-user shoulder harness-based lifting apparatus that supports a single strap between two users.

Another aspect of the present invention is to provide a tension adjustment buckle for each shoulder harness to enable the user to cinch up his strap end as desired.

Another aspect of the present invention is to provide a three or more user system having a central ring to combine the straps of each user.

Another aspect of the present invention is to provide a single metal piece design for the system.

Other aspects of this invention will appear from the following description and appended claims, reference being made to the accompanying drawings forming a part of this specification wherein like reference characters designate corresponding parts in the several views.

One embodiment of the present invention uses an "X" style pattern of straps across the user's back. The top and bottom ends of each side of the "X" form a loop in front, which carries a central tension buckle having receiving slots. The central tension buckle is a wide (about seven-inches) tension buckle, which adjustably supports a wide webbed strap end.

In operation, the single flat strap is placed under the load. Each user adjusts a single tension buckle in preparation to lift. During the lift and carry process, each user's arms are free to steady the load.

BRIEF DESCRIPTION OF THE DRAWINGS

Before explaining the disclosed embodiment of the present invention in detail, it is to be understood that the invention is not limited in its application to the details of the particular arrangement shown, since the invention is capable of other embodiments.

Also, the terminology used herein is for the purpose of description and not of limitation.

DETAILED DESCRIPTION OF THE DRAWINGS

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Figure 1:
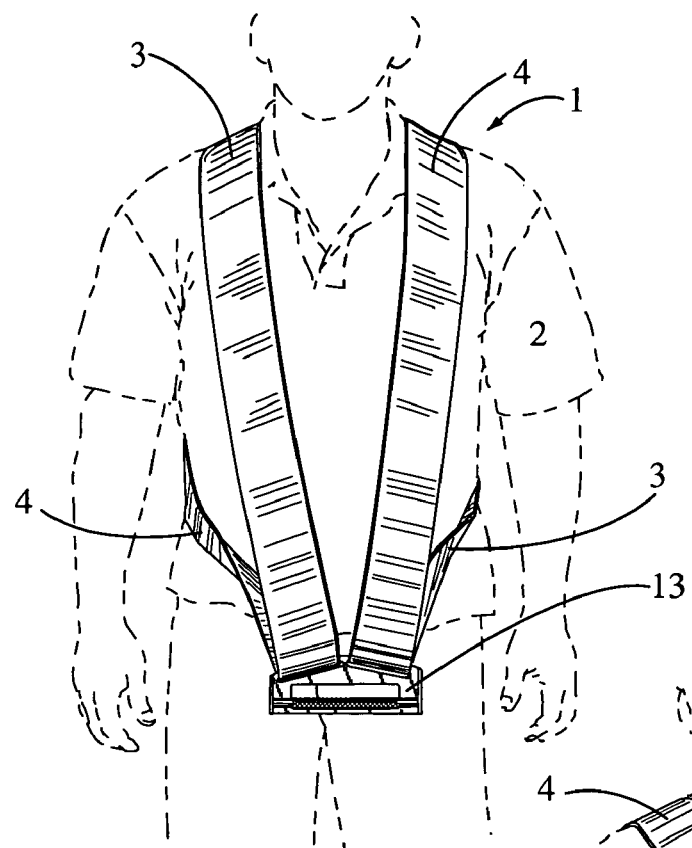
FIG. 1 is a front plan view of one embodiment of the lifting harness worn by a user illustrated with dotted lines.
Figure 2:
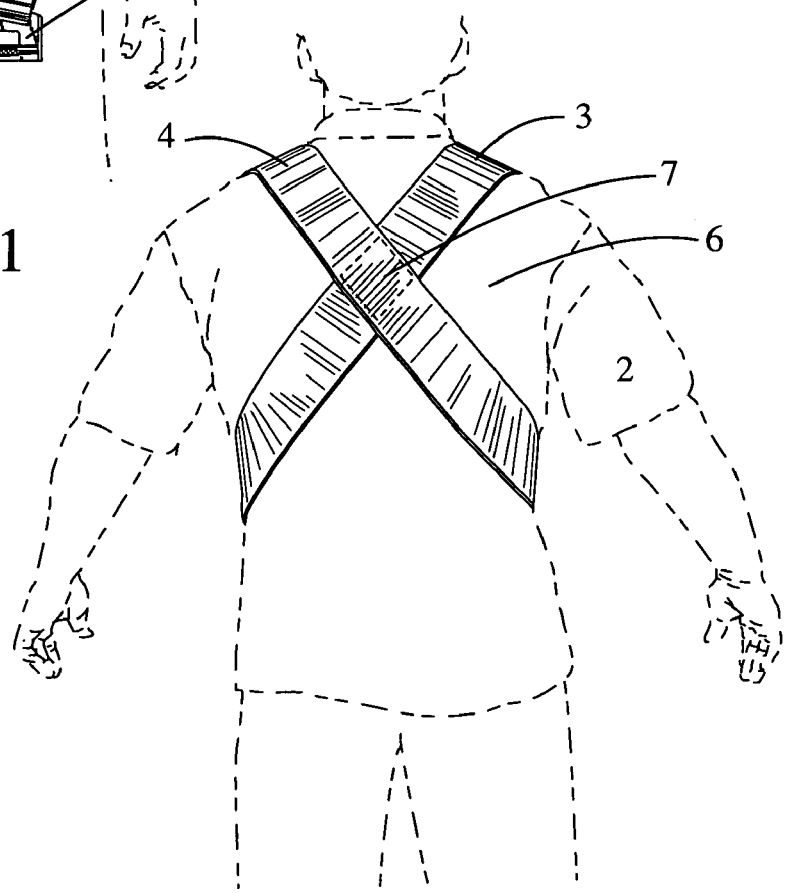
FIG. 2 is a back plan view of the FIG. 1 embodiment.

Referring to FIGS. 1, 2, one embodiment, lift harness 1, is shown. A figure eight continuous strap forms a right shoulder loop 3 and a left shoulder loop 4. Loops 3, 4 may form an "X" pattern across user's 2 back 6. The "X" pattern may be held together on back 6 of user 2 with closure material 7. Closure material 7 may be constructed from, but is not limited to, hook and latch material, thread, zippers etc. Closure material 7 may prevent travel of the rear portions of loops 3, 4. All loads may be shared evenly by loops 3, 4. Loops 3, 4 may be connected to a tension buckle 13, which is about seven-inches wide.

Figure 3:
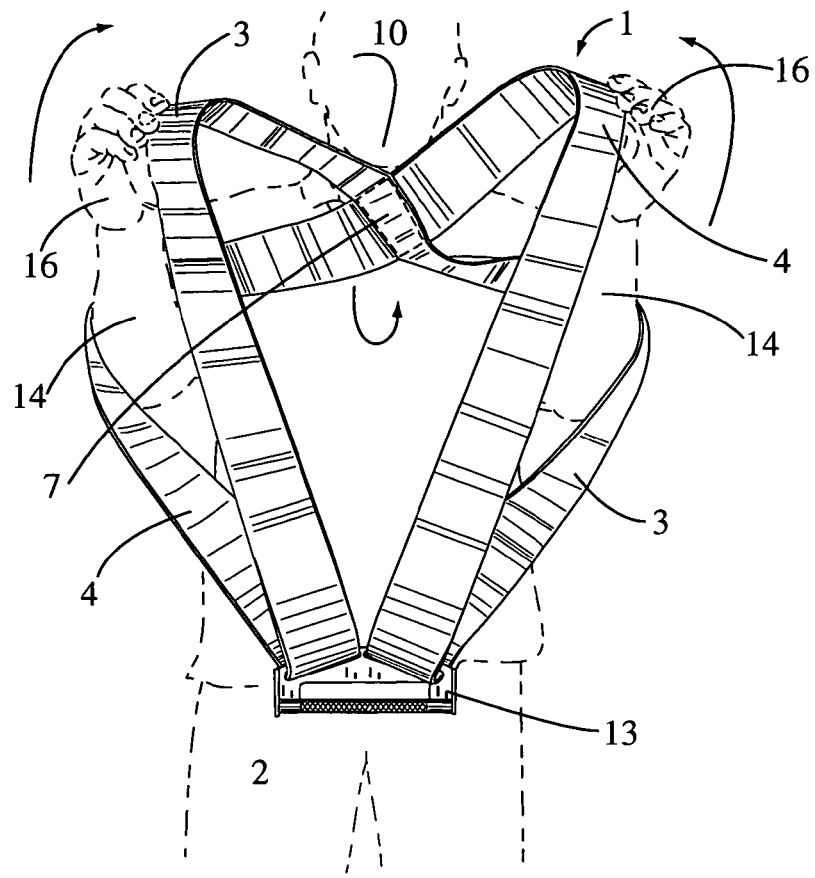
FIG. 3 is a top perspective view showing the FIG. 1 embodiment being put on by a user.
Figure 4:
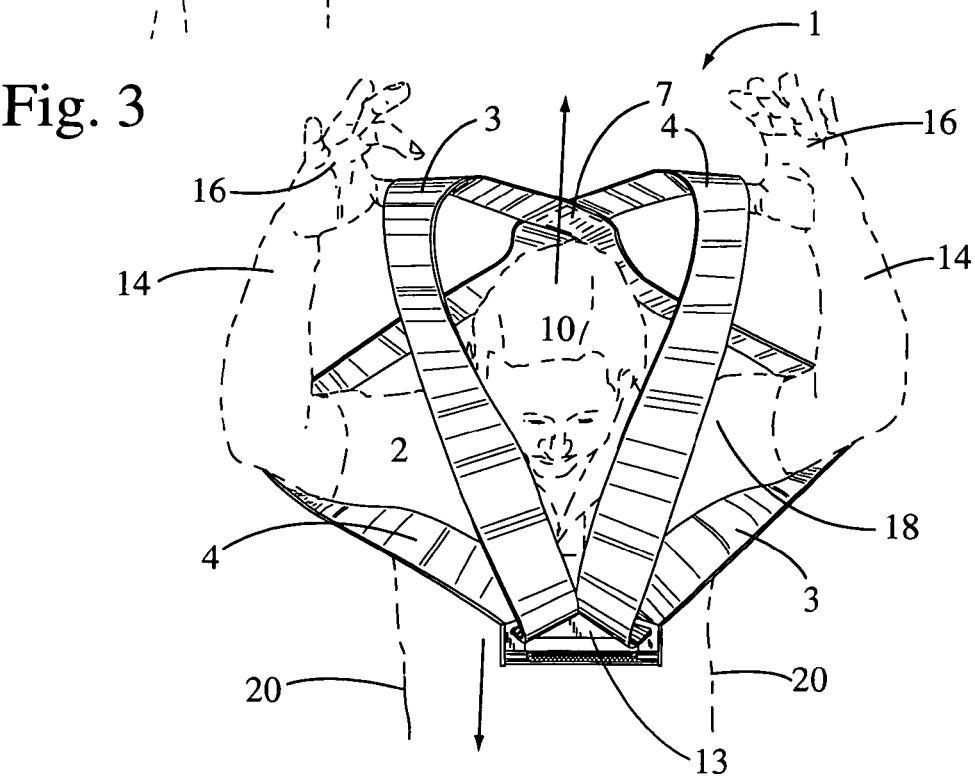
FIG. 4 is a top perspective view showing the FIG. 1 embodiment illustrating a user placing the lifting harness over his head, which completes the mounting process.

Referring next to FIGS. 3, 4, in FIG. 3 user 2 is beginning to place lift harness 1 over user's 2 shoulders 18 shown in FIG. 4. User 2 puts arms 14 through the lower portion of loops 3, 4 and places hands 16 on the upper portion of loops 3, 4. The outer surface of closure material 7 is about level with user's 2 head 10.

In FIG. 4, user 2 then raises arms 14 and lift harness 1 so that user 2 can place user's 2 head 10 through loops 3, 4. Once user 2 places his head through loops 3, 4 and lowers arms 14, the upper portions of loops 3, 4 rest on user's 2 shoulders 18 and the lower portions of loops 3, 4 rest at user's 2 sides 20.

Figures 5, 6:
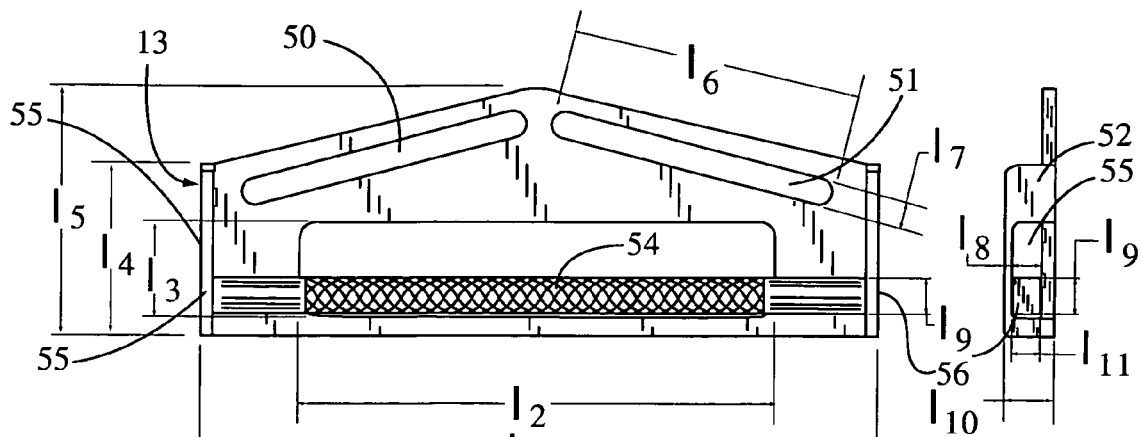
FIG. 5 is a front plan view of one embodiment of the tension buckle.
FIG. 6 is a side plan view of the FIG. 5 embodiment of the tension buckle.
Figure 7:
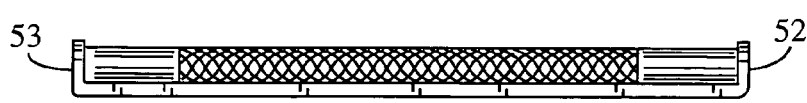
FIG. 7 is bottom plan view of the FIG. 5 embodiment of the tension buckle.
Figure 8:
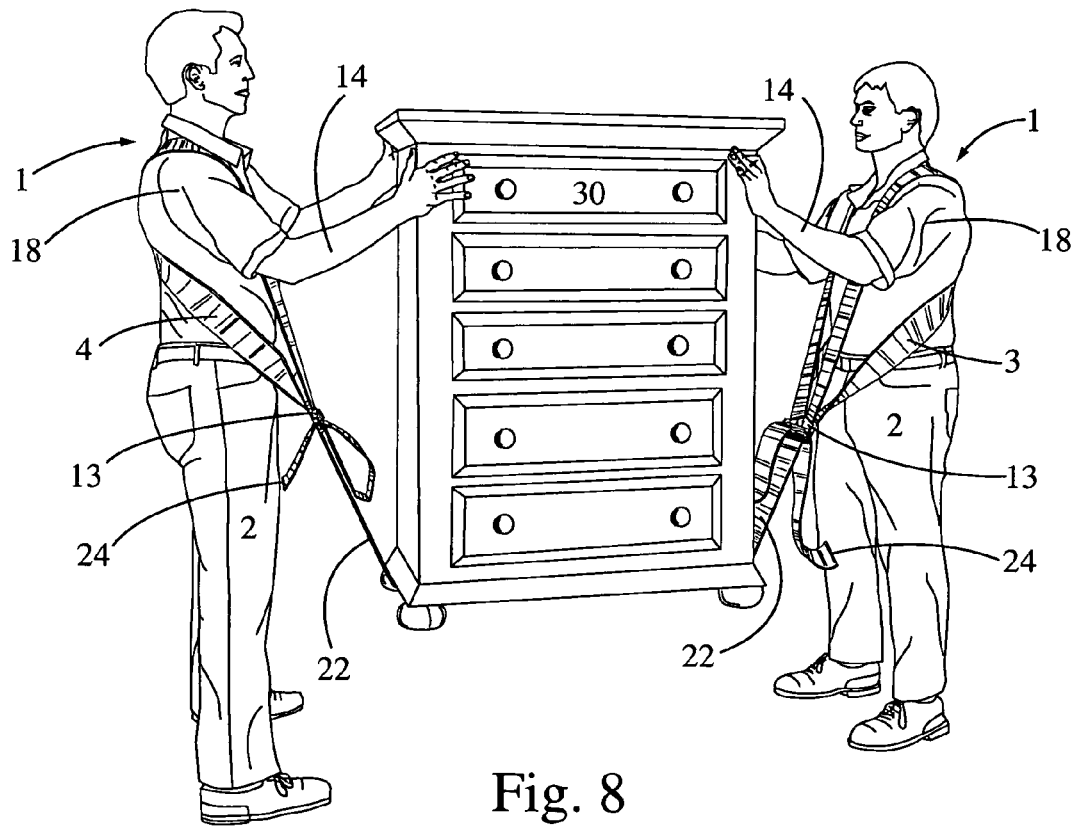
FIG. 8 is a side perspective view of two users lifting a dresser with the FIG. 1 embodiment.

Referring next to FIGS. 5, 6, 7, tension buckle 13 is about seven-inches wide, $l_1$ is about 7-inches. Loops 3, 4 may run through slots 50, 51 of tension buckle 13. A central roller 54 is knurled and slides up and down in slot 55 on side panels 52, 53 via end pieces 56, thereby allowing for locking of lift strap 22 under a load. The single, wide lift strap helps provide stability when placed directly under large objects as shown in FIG. 8. Nominal dimensions for tension buckle 13 are: $l_2$ is about 5-inches, $l_3$ is about 1-inch, $l_4$ is about 1.875-inches, $l_5$ is about 2.625-inches, $l_6$ is about 3.00-inches, $l_7$ is about 0.2 $l_8$ is about 0.125-inches, $l_9$ is about 0.375-inches, $l_{10}$ is about 0.4375-inches, $l_{11}$ i about 0.1875-inches.

Referring next to FIG. 8, two users 2 each have an identical lift harness 1 mounted on their shoulders 18. Lift strap 22 is about five-inches wide and may be made of a webbed construction. However, any suitable material known in the art may be used. End 24 threads through tension buckle 13 in a known manner to allow user 2 to cinch up lift strap 22 under dresser 30 after lift strap 22 is placed under dresser 30. Each user's 2 arms 14 are free to steady the load, dresser 30. Dresser 30 may be delivered across a pebble surface, cracked pavement and/or a wet surface without damage and over surfaces where wheels on a dolly or hand truck would not function.

Figure 9:
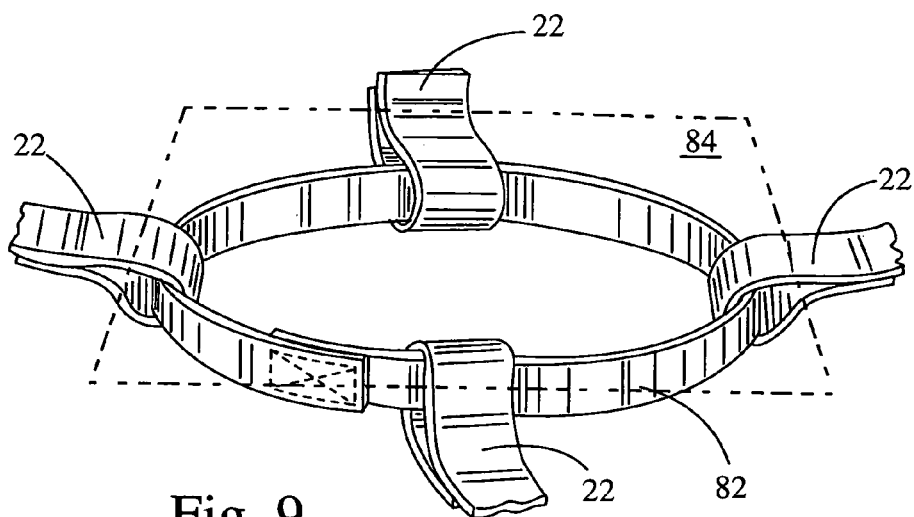
FIG. 9 is a top perspective view of an alternate embodiment central ring for enabling three or more users to combine their straps under a heavy load.

Referring next to FIG. 9, four users (not shown) each have a lift strap 22. A central ring 82 joins all four lift straps 22. The central ring 82 is placed under a heavy load 84, shown in dotted lines, to share the lifting among the four users.

Figures 10, 11:
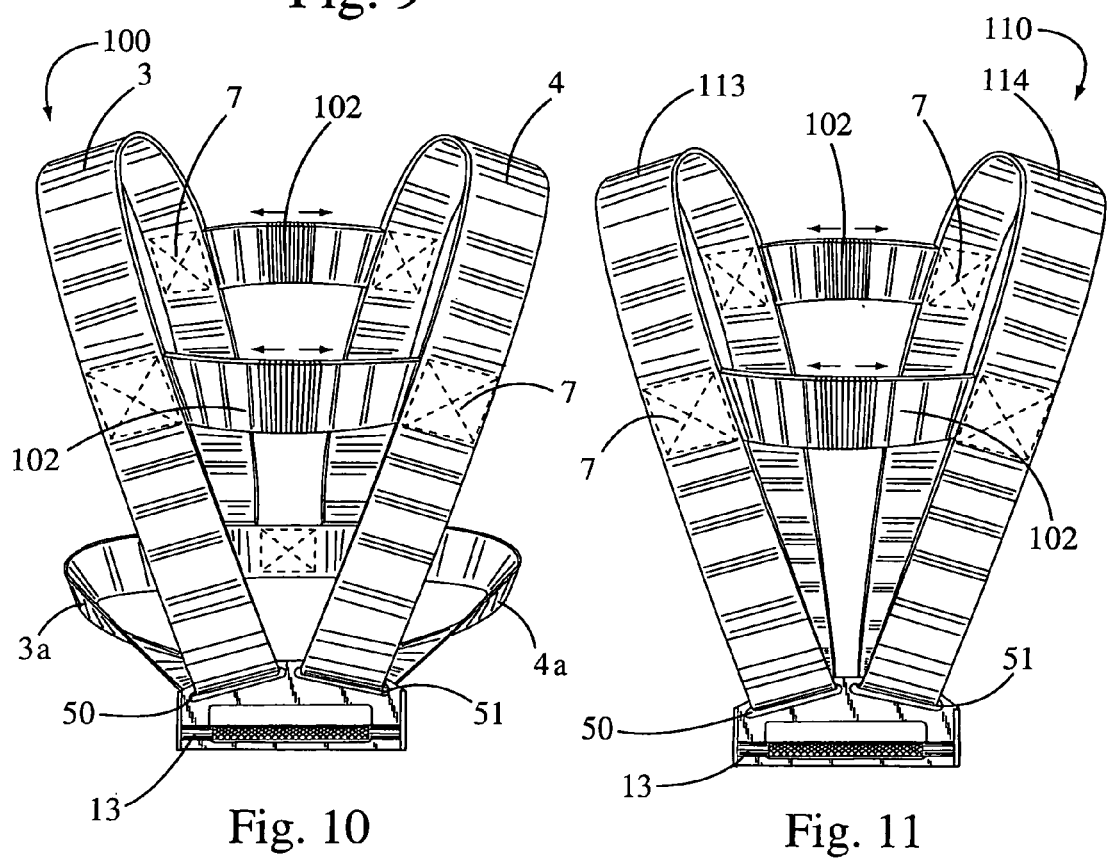
FIG. 10 is a front plan view of another embodiment of the lifting harness.
FIG. 11 is a front plan view of another embodiment of the lifting harness.

Referring next to FIG. 10, another embodiment, lift harness 100, is shown. A single continuous strap forms a right shoulder loop 3 and a left shoulder loop 4. Central horizontal members 102 form an "H" pattern across the front and back of user 2 (not shown). The "H" pattern may be held together on the front and back of user 2 (not shown) with closure material 7. Closure material 7 may be constructed from, but is not limited to, hook and latch material, thread, zippers etc. Central horizontal members 102 may help prevent shoulder loops 3, 4 from falling off the shoulders. While two central horizontal members are shown, only one central horizontal member 102 is necessary to prevent shoulder loops 3, 4 from falling off the shoulders. All loads may be shared evenly by loops 3, 4. Loops 3, 4 may be connected to a tension buckle 13, which is about seven-inches wide. Optional waist band loop segments 3a, 4a may be attached to lift harness 100 for additional support.

Referring next to FIG. 11, another embodiment, lift harness, 110 is shown. A single continuous strap forms right shoulder loop 113. A second, single continuous strap forms left shoulder loop 114. Loops 113, 114 may be connected to each other by central horizontal members 102. Central horizontal members 102 form an "H" pattern across the front and back of user 2 (not shown). The "H" pattern may held together on the front and back of user 2 (not shown) with closure material 7. Closure material 7 may be constructed from, but is not limited to, hook and latch material, thread, zippers etc. Central horizontal members 102 may help prevent shoulder loops 113, 114 from falling off the shoulders. While two central horizontal members are shown, only one central horizontal member 102 is necessary to prevent shoulder loops 113, 114 from falling off the shoulders. All loads maybe shared evenly by loops 113, 114. Loops 113, 114 may be connected to a tension buckle 13, which is about seven-inches wide.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A lifting harness comprising:
   a strap configured into a figure eight to form a left and a right support loop sized to fit around a first user's torso;
   a tension buckle having webbing slots housed thereon to receive the left and the right support loops;
   wherein said tension buckle comprises at least one side panel having a receiving slot to receive a central roller;
   said tension buckle further comprises a unitary one piece body segment having a left and a right webbing slot formed in said one piece body segment and a knurled, cylindrical central roller that slides up and down in roller slots on side panels of the unitary one piece body segment of the tension buckle;
   a central lift strap mounted to said tension buckle, thereby enabling the central lift strap to be connected to a second user's tension buckle to use the central lift strap to lift and carry objects;
   wherein the left support loop mounts through the left webbing slot located along a top edge of a central body piece of the tension buckle, and the right support loop mounts through the right webbing slot located along the top edge of the central body piece;
   wherein during a downward force exerted on the central lift strap, a front segment of each of the left and right support loops lies flat against the first user's torso;
   wherein the tension buckle of each of the first and the second user is supported in the front of each user respectively;
   wherein the central lift strap has a width in excess of three inches; and
   wherein the tension buckle webbing slots are about three inches long.

2. The apparatus of claim 1, wherein the left and the right support loops are continuous and form an "X" pattern on a back of the user and are connected by a closure material.

3. The apparatus of claim 1, wherein the left and the right strap loops form an "H" pattern on the back of the user, and said strap loops are connected by at least one central cross strap.

4. The apparatus of claim 1 further comprising three or more lifting harnesses each having a central lift strap attached to a common lift ring, thereby enabling several users to lift an object via the lift ring.

5. The apparatus of claim 1, wherein at least one central cross strap connects said left and right strap loops together for safety and support.

6. The apparatus of claim 5, wherein the central cross strap connecting the left and right straps loops forms an "H" pattern on a back of the user.

7. The apparatus of claim 5, wherein the central cross strap connecting the left and right straps loops forms an "H" pattern on a front of the user.

8. The apparatus of claim 5, wherein two central cross straps connecting the left and right straps loops forms an "H" pattern on a back and front of the user.

* * * * *

UNITED STATES PATENT AND TRADEMARK OFFICE
CERTIFICATE OF CORRECTION

PATENT NO. : 7,331,493 B2  Page 1 of 1
APPLICATION NO. : 10/845940
DATED : February 19, 2008
INVENTOR(S) : Thomas E. Dent, III It is certified that error appears in the above-identified patent and that said Letters Patent is hereby corrected as shown below:

Column 3, line 35, "$1_7$ is about 0.2" should read --$1_7$ is about 0.250-inches,--

Column 4, line 11, "may held" should read --may be held--

Column 6, line 2, "left and right straps loops" should read --left and right strap loops--

Column 6, line 5, "left and right straps loops" should read --left and right strap loops--

Column 6, line 8, "left and right straps loops" should read --left and right strap loops--

Signed and Sealed this

First Day of July, 2008

JON W. DUDAS
*Director of the United States Patent and Trademark Office*